(12) United States Patent
Rooney

(10) Patent No.: US 7,997,951 B2
(45) Date of Patent: Aug. 16, 2011

(54) INSECT, BIRD, AND ANIMAL CALL

(75) Inventor: Russell Rooney, Richfield, MN (US)

(73) Assignee: Loontune, Inc., Richfield, MN (US)

( * ) Notice: Subject to any disclaimer, the term of this patent is extended or adjusted under 35 U.S.C. 154(b) by 1369 days.

(21) Appl. No.: 11/230,208

(22) Filed: Sep. 19, 2005

(65) Prior Publication Data

US 2006/0073759 A1    Apr. 6, 2006

Related U.S. Application Data

(60) Provisional application No. 60/611,072, filed on Sep. 20, 2004.

(51) Int. Cl.
*A63H 1/32* (2006.01)
*A63H 1/00* (2006.01)

(52) U.S. Cl. .................... 446/214; 446/397; 446/265

(58) Field of Classification Search ................. 446/214, 446/215, 265, 266, 397

See application file for complete search history.

(56) References Cited

U.S. PATENT DOCUMENTS

| | | | | |
|---|---|---|---|---|
| 190,438 A * | 5/1877 | Jenkins | ......................... | 446/214 |
| 2,117,133 A * | 5/1938 | Bell | .............................. | 446/214 |
| 2,841,922 A * | 7/1958 | Kolintzas | ....................... | 446/242 |
| 4,167,831 A * | 9/1979 | Arzola | ............................ | 446/215 |
| 4,221,075 A * | 9/1980 | Gallagher | ..................... | 446/202 |
| 5,690,534 A | 11/1997 | Shea | | |
| 6,149,492 A * | 11/2000 | Davis, Jr. | ....................... | 446/397 |
| 6,802,758 B2 * | 10/2004 | Somers | .......................... | 446/242 |

OTHER PUBLICATIONS http://web.archive.org/web/20030923065538/http://www.thunder-gift.com/shop/promo_loon.php, 2003.*
Disclosure of Prior Disc Devile as stated in Specification pp. 8-9.

* cited by examiner

*Primary Examiner* — Gene Kim
*Assistant Examiner* — Urszula M Cegielnik
(74) *Attorney, Agent, or Firm* — Dardi & Herbert, PLLC

(57) ABSTRACT

Materials and methods for making and using a bird call device involving a surface having a central axis perpendicular to the surface and an opening that is displaced from the central axis by a distance, with the opening being shaped to emit a bird call when the surface is rotated about the central axis.

10 Claims, 3 Drawing Sheets

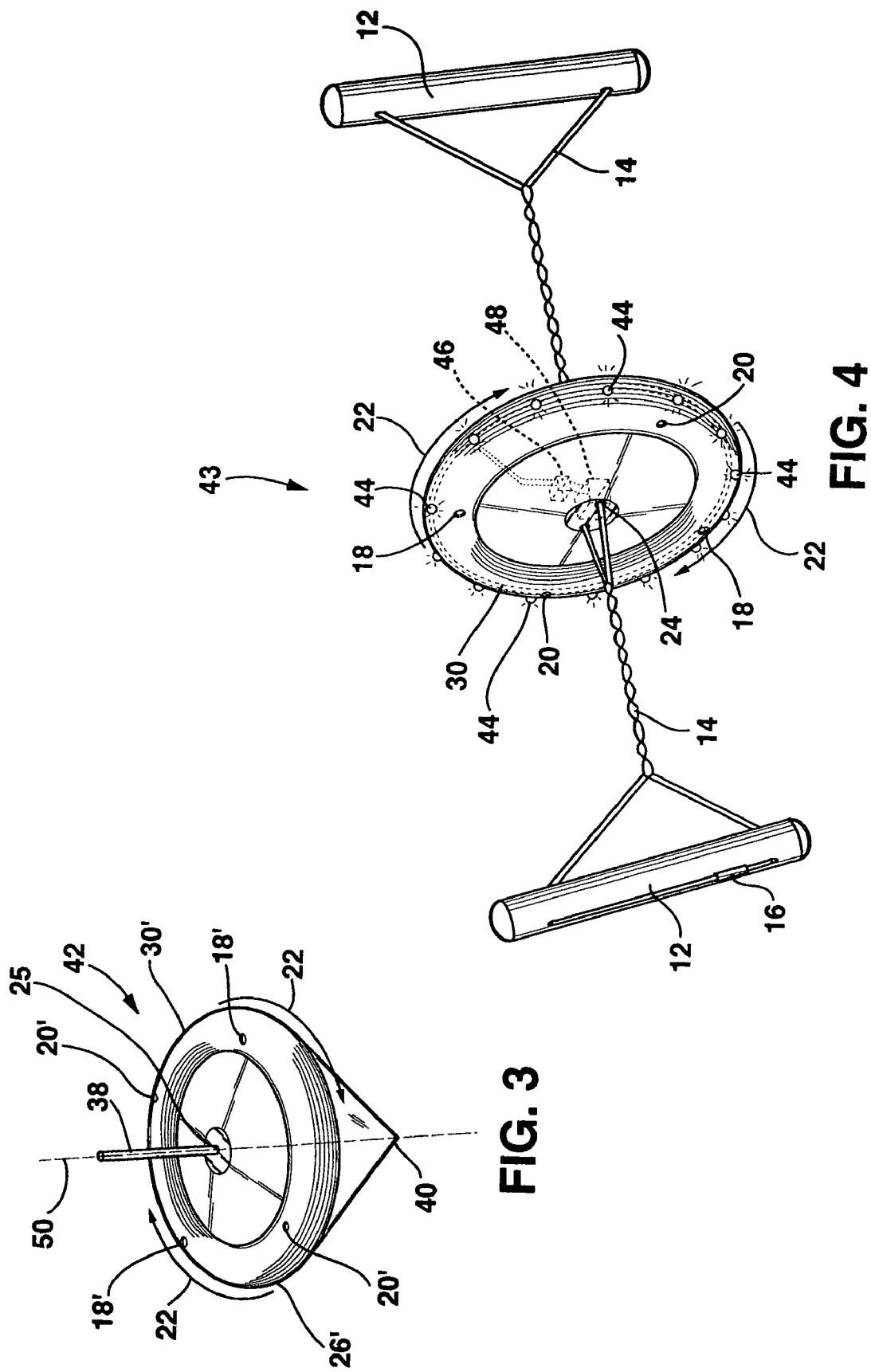

INSECT, BIRD, AND ANIMAL CALL

CROSS-REFERENCE TO RELATED APPLICATIONS

This application claims priority to U.S. Patent Application Ser. No. 60/611,072, filed Sep. 20, 2004, entitled "Insect, Bird, and Animal Call", which is hereby incorporated by reference herein.

FIELD OF THE INVENTION

The field of the invention is related to bird call devices and toys for imitating animal sounds.

SUMMARY OF THE INVENTION

Methods and devices for making a bird call are described herein, including the call of the common Loon. Some embodiments involve spinning a surface that has openings in it, with the rate of spin and sizing of the openings contributing to the sound that is created.

Certain embodiments are directed to a method of making a bird call, the method comprising spinning a surface having a central axis perpendicular to the surface and an opening that is displaced from the central axis by a distance, with the spinning motion causing the opening to emit a bird call as a result of air moving across the opening.

Certain embodiments are directed to a bird call device comprising a surface having a central axis perpendicular to the surface and an opening that is displaced from the central axis by a distance, with the opening being shaped to emit a bird call when the surface is rotated about the central axis.

BRIEF DESCRIPTION OF THE FIGURES

FIG. 3 depicts an alternative embodiment of the invention, with a dowl being used to impart spin to the device; and FIG. 4 depicts an alternative embodiment of the invention, with the embodiment of FIG. 1 being embellished with lights and a photovoltaic sensor.

DETAILED DESCRIPTION OF PREFERRED EMBODIMENTS OF THE INVENTION

The flow of air into or across a hole or opening can generate noise. In the case of a conventional whistle, the flow of air to make a whistling noise is provided by the user blowing into the whistle. In the case of a musical instrument such as an organ, the flow of air to sound a note may be provided by a bellows.

In the case of the invention, a flow of air is provided by moving a surface. A spinning motion can be used to cause air to flow across a surface. The surface has holes or openings. As the air flows across the holes or openings, a noise is generated. The pitch and quality of the noise is affected by the speed of the spin and the size of the holes. The size and placement of the openings and spinning technique can be adjusted to produce a sound that imitates the noise made by an animal, e.g., a bird call, in particular the call of a common Loon.

Devices have, in the past, been devised that can be used to replicate the calls of the common loon. Heretofore, however, such devices have required instructions that can be difficult for a child to operate. Further, it is not believed that any such loon call devices have an operating principle of structure similar to those disclosed herein.

An embodiment of the invention provides a device or wind instrument that can be used to replicate the calls of the common loon, that is very easy for even a child to operate, and can produce calls that fairly accurately replicate two primary calls of the common loon (gavia immer). Materials and methods are set forth for making and using a bird call device, including those with a surface having a central axis perpendicular to the surface and an opening that is displaced from the central axis by a distance, with the opening being shaped to emit a noise, e.g., an animal or bird call, when the surface is rotated about the central axis.

An embodiment as set forth herein is an ultrasonically welded wind instrument that makes sounds similar to that of the common loon (gavia immer). An instrument that can make a "wail" Loon sound when spun with a rope at low speeds and a "tremolo" Loon sound when spun at higher speeds. As described in U.S. Pat. No. 5,690,534, hereby incorporated by reference herein, the calls of the common loon typically range from about 800 to about 1300 cycles per second.

Figure 1:
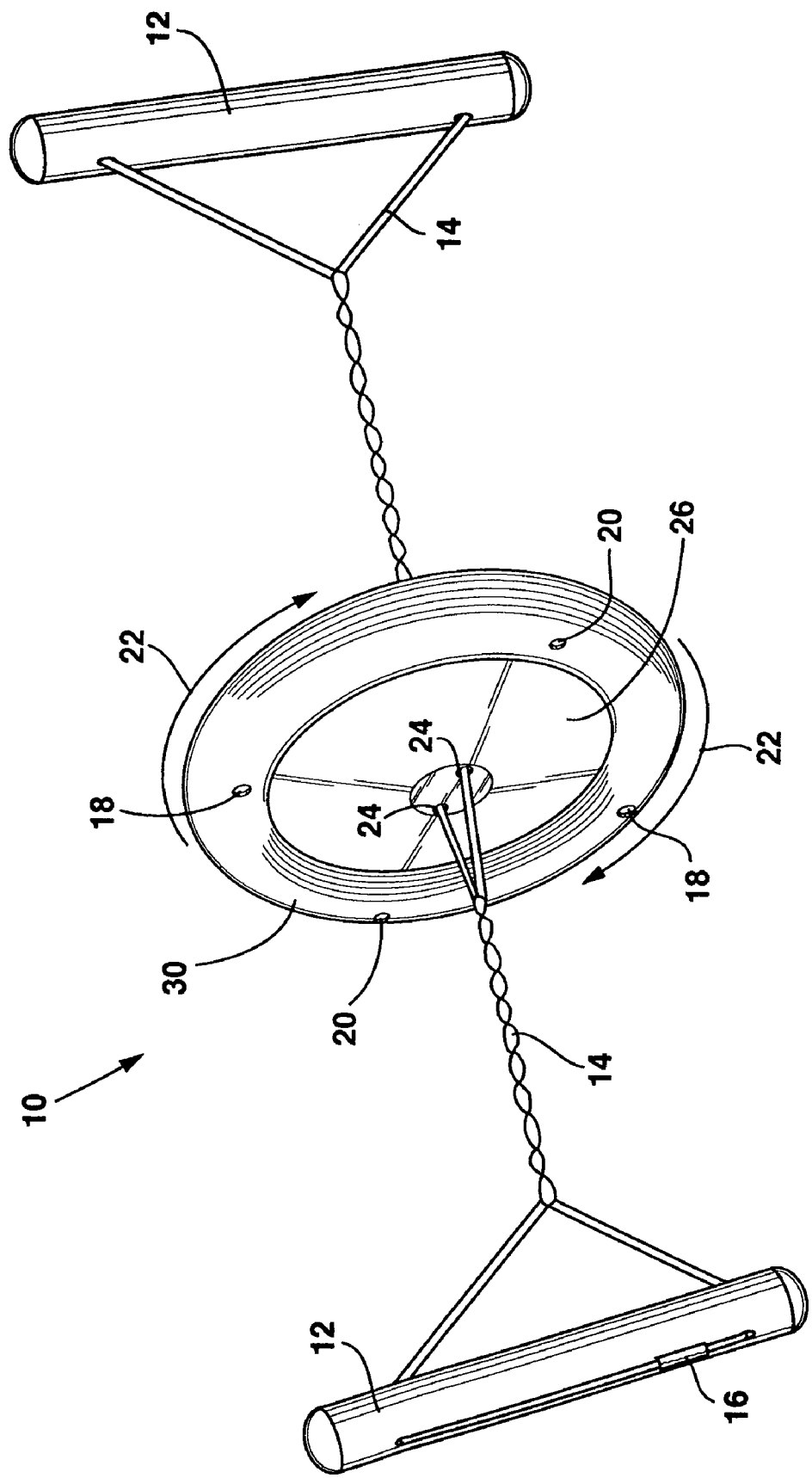
FIG. 1 depicts an embodiment of the invention, with a string being used to impart spin to the device.

Referring to FIG. 1, device 10 has a disc-shape 30 with exterior surface 26 with 0.7 cm diameter holes 18 and 0.5 cm diameter holes 20 that pass through surface 26 and communicate with the interior of device 10, which is hollow. Surface 26 further has boreholes 24 that receive string 14, which is connected to handles 12, with the ends of string 14 being fastened with fastener 16. A central axis (not shown) that is perpendicular to surface 26 passes through the center of disc-shape 30. Boreholes 24 are set off from the central axis by a distance, and are positioned so that a line passing through the center of boreholes 24 would pass through the center of disc-shape 30, which is the same point that the central axis passes through on surface 26. Holes 18 and holes 20 are separated from the central axis by a distance, which may be varied for each hole or group of holes in alternative embodiments.

In the embodiment of FIG. 1, disc 30 has a diameter of 16 cm; alternative embodiments have a diameter ranging from about 8 to about 24 cm. In the embodiment of FIG. 1, the holes 18 and holes 20 are displaced from the central axis by a distance of approximately 7 cm; alternative embodiments place the holes at a distance independently chosen in a range from about 3 to about 11 cm from the center of the device. Other dimensions not within the ranges explicitly set forth may also be used as would be appropriate in light of the sizing and other features of the device.

Referring to FIG. 1, a user may rotate surface 26 to wind-up string 14 and then pull handles 12 away from each other to impart a spinning motion to surface 26, as indicated by arrow 22, so that air moves across holes 18, 20. The speed of rotation of surface 26 may be controlled by the user by adjusting the rate at which handles 12 are separated from each other. In this embodiment, sounds of the common loon call can be replicated.

Figure 2:
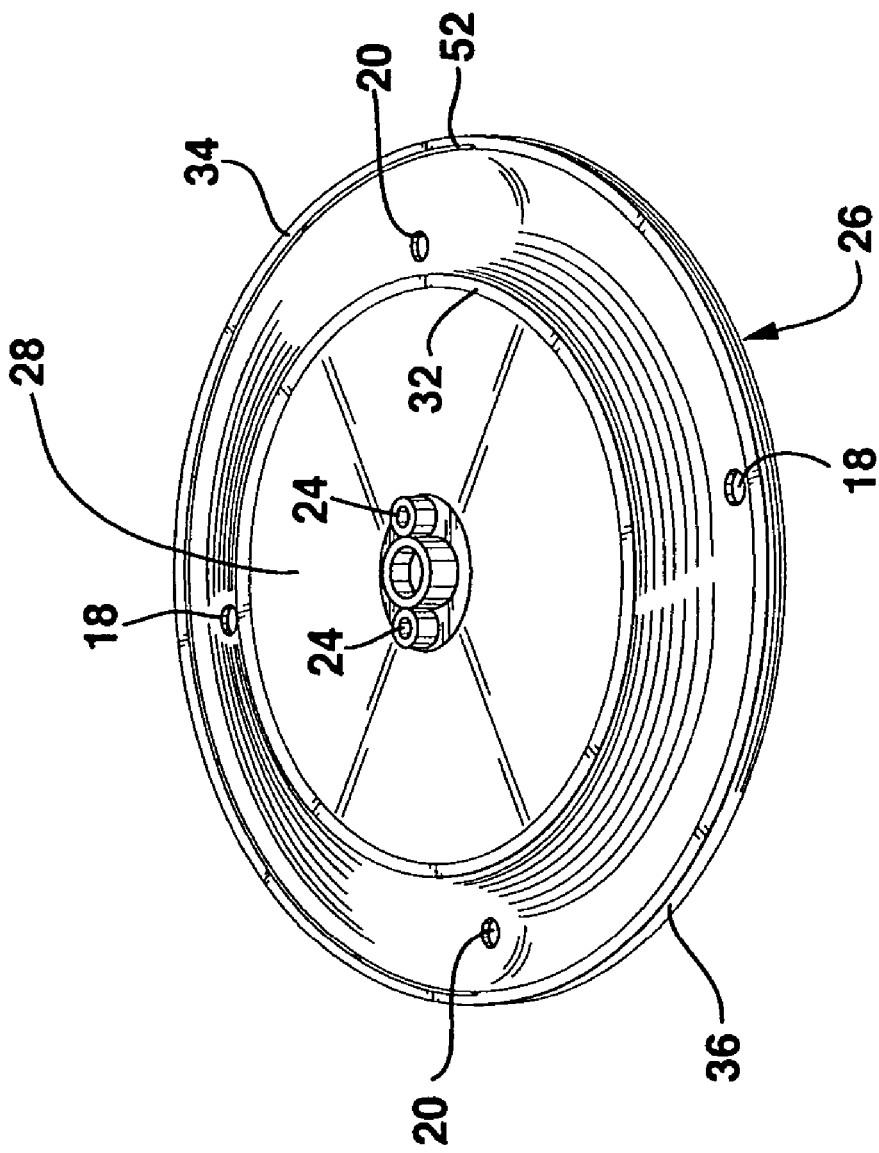
FIG. 2 depicts a part used to make the embodiment of FIG. 1.

Referring to FIG. 2, a one half disc portion 36 of the embodiment of FIG. 1 is depicted, with interior surface 28 being pierced by holes 18, 20, and boreholes 24. Inner ultrasonic welding surface 32 and outer ultrasonic welded surface 34 mate with corresponding surfaces on the other half disc portion (not shown) and may be ultrasonically welded, glued, or otherwise fastened to each other to form disc shape 30.

Referring to FIG. 3, the device may be configured in a cone-shape, e.g., as a spinning top. Spinning top 42 has a disc-shape 30' with exterior surface 26' with 0.7 cm diameter holes 18' and 0.5 cm diameter holes 20' that pass through surface 26' and communicate with the interior of device 42. Surface 26' further has central borehole 25 aligned with central axis 50 that may optionally receive dowel 38. Holes 18' and holes 20' are separated from the central axis by a distance, which may be varied for each hole or group of holes in alternative embodiments. Cone-shaped bottom 40 connects to surface 26'. A user may spin dowel 38 to impart rotation to spinning top 42 and surface 26' so that air moved past holes 18', 20'. The amount of rotation imparted may be used to control the rate of rotation and the sound produced from movement of air across the holes.

Referring to FIG. 4, the embodiment of FIG. 1 may be further equipped with lights 44, as in device 43. Switch 46 and photovoltaic cell 48 cooperate to equip the lights with power and an on-off mechanism. A user may turn the lights on and operate device 43 as described for device 10, above. For example, a Lithium 3V CR1220 battery can be used to power a small LED device as in device 43.

Also included in certain embodiments are lights imbedded or otherwise attached to the device. The lights may be LEDs or other types of lights. The lights may be activated by a switch, and may optionally be triggered by centrifugal force. Power may be provided by, for example, a battery or devices that transduce centrifugal force to electricity. For example, the centrifugal force acts on the switch and it closes an electrical circuit thereby enabling the light to turn on. Examples of a switch being acted upon by centrifugal force includes, for example: a magnet and a magnetism sensor arranged in a way that a spring compresses and the sensor senses the magnet. Alternatively, the same system as aforementioned except that the sensor senses when the magnet is not close enough and thereby activates the switch. A mechanical spring can be used as part of a switch contact mechanism.

The plastic parts of the device may have a hermaphroditic energy director on the outer edge of the part for a clean ultrasonic weld; for example, the welding surfaces shown in the Figures. To make the welds, a black power booster with the following settings was used with a Branson ultrasonic welder: 30 P.S.I., Weld Time 0.500, Hold Time 0.800, No Pre-trigger, Down Speed 10 and Trigger Force 1.5.

Holes or openings placed in a movable surface may be of varying sizes chosen to produce a desired sound predetermined by the user. For example, the holes may be independently chosen to have a diameter ranging from about 0.1 to about 2.0 cm. Further, the sound that is to be achieved may be controlled by adjusting the rate at which an opening is moved through the air. In the case of a spinning motion about a central axis, the speed of the movement is increased by placing the holes farther from the central axis. In general, the larger the size of the hole, the lower the sound's pitch. Experiments were made using several different sizes and combinations of holes depicted in FIG. 1; others, after reading this application, will be able to choose holes sizes and hole placements that are appropriate in light of the size, rotation rate, and other features of the device.

In certain embodiments, the rotatable surface is a cylinder or circular tube, or other shape. In some embodiments, the devices may move from spinning by hand motion or by application of another outside energy source, e.g., by a mechanical apparatus. The opening on a surface of the device may be, for example, a hole, indent, or groove to affect the airflow.

Different styled handles may be used for the device and various materials including wood, plastic, or string. String, as used herein, is a broad term used for convenience to designate string and other materials that may be used in a comparable fashion in the context of the invention. Examples of a string are: twine, rope, monofilament line, lanyards, and plastic tubing. The string may be coupled, welded, or otherwise secured to the device, including by direct attachment to a rotatable surface or other portion of the device. Suitable materials for the main portions of the device include ABS or styrene or other engineering plastics, wood, or metals.

Some embodiments include the use of printed material on the string used to spin the device. And some embodiments include cosmetic changes such as coloration, printing, or designs placed on the device, e.g., by a method such as pad printing, sticky labels, in-mold decorating, screen-printing, and engraving.

An embodiment of the invention is a cylindrical device with a tubular ring projecting from the outside perimeter and two bores in the center to secure the rope for spinning the device. On the outer edge located at the apex of the tubular portion of the disc shaped device there are two bores of the same size located 180 degrees from each other and two additional bores equidistant from the first aforementioned holes but of an incrementally larger diameter.

An embodiment of the invention is a wind instrument that comprises a tubular disc having two 0.7 cm holes with opposite axially spaced inlet and outlet ends and two 0.5 cm holes with opposite axially spaced inlet and outlet ends. The different size and location of the aforementioned holes help produce the wail call of the common loon. The wail call results in a steady sound frequency when the disc is being spun at lower revolutions per second. When the revolutions per second are increased to higher speeds the tremolo sound of the loon is made which results in sounds that vary in frequency and intensity.

An embodiment of the device includes the association of an image of a common loon with the device. For example, a loon image could be printed, engraved or burned onto the disc or handle surfaces. Or, for example, an image or plastic loon figure could be associated with the disc, cylinder, or the spinning top. For example, a cone shaped bottom and then a short dowel on top with a plastic loon character could be used to spin the device.

The Applicant temporarily possessed a prior disc device that is believed to have been sold to the public by others over thirty years ago. The prior disc device was a disc that had holes near its periphery, but the shape of the prior device was different from that shown in FIG. 1. The prior disc device, as compared to the device of FIG. 1, had peripheral holes similar in size and relative position, although the size and position of the holes were not identical. The Applicant recalls the prior device as having additional holes and protruding pegs that were likely used to snap the part together. The Applicant does not believe that the device was necessarily rotated as described herein, used as an animal, bird or insect call, or had other features as described herein. Applicant has been unable to locate another one of these prior disc devices.

Persons of ordinary skill in these arts will appreciate, after reading this disclosure, various other embodiments that are within the scope and spirit of the invention. Such artisans will immediately appreciate that the various elements set forth for the explicitly described embodiments may be freely interchanged with each other to make a device that operates according to the principle of the invention. Moreover, such artisans will immediately appreciate that the explicitly stated ranges include every subrange with the explicitly stated ranges, and the values that fall outside the explicitly stated ranges may be used as appropriate to the spirit of the invention.

The invention claimed is:

1. A method of making a bird call, the method comprising spinning a surface having a central axis perpendicular to the surface and an opening that is displaced from the central axis by a distance, with the spinning motion causing the opening to emit a bird call as a result of air moving across the opening, wherein the bird call is that of a *Gavia immer*.

2. The method of claim 1 wherein the device further comprises a second opening offset from the central axis by a second distance, with the first opening and the second opening having different diameters relative to each other.

3. The method of claim 1 further comprising spinning the surface by pulling on a first string and a second string, with the first string passing through a first borehole disposed in the surface and the second string passing through a second borehole disposed in the surface.

4. The method of claim 1 wherein the device further comprises a light.

5. The method of claim 1 wherein a plan view of the surface along the central axis defines a circle.

6. The method of claim 1 further comprising placing a dowel in a central hole in the surface and rotating the dowel to spin the surface.

7. The method of claim 3, wherein the first string and the second string are joined to a common handle.

8. The method of claim 4 wherein the light is pointed in a direction substantially parallel to the surface.

9. The method of claim 1, further comprising providing instructions for using the device to make the bird call.

10. The method of claim 1 wherein the Gavia immer call is the tremolo or the wail.

* * * * *